United States Patent [19]
Hamilton

[11] 3,888,503

[45] June 10, 1975

[54] LIMITING OF CONTINUOUS EXTENT OF INFLATABLE RESTRAINT

[75] Inventor: Brian K. Hamilton, Utica, Mich.

[73] Assignee: Allied Chemical Corporation, New York, N.Y.

[22] Filed: Feb. 22, 1973

[21] Appl. No.: 334,804

[52] U.S. Cl.................... 280/150 AB; 280/150 SB
[51] Int. Cl............................................ B60r 21/10
[58] Field of Search............... 280/150 B, 150 SB; 9/316–322; 244/121 B, 151 R

[56] References Cited
UNITED STATES PATENTS

| | | | |
|---|---|---|---|
| 1,701,927 | 2/1929 | Lange | 9/322 |
| 2,202,415 | 5/1940 | Christopher et al. | 19/316 |
| 3,104,403 | 9/1963 | Lortz | 9/322 |
| 3,146,460 | 9/1964 | Henderson | 280/150 SB |
| 3,302,973 | 2/1967 | Ravau | 244/151 R |
| 3,430,979 | 3/1969 | Terry et al. | 280/150 AB |
| 3,682,498 | 8/1972 | Rutzski | 280/150 AB |
| 3,801,156 | 4/1974 | Granig | 280/150 AB |

Primary Examiner—Kenneth H. Betts
Attorney, Agent, or Firm—Jonathan Plaut

[57] ABSTRACT

An inflatable restraining band for vehicle safety systems having a series of sections, some of which are inflatable to a greater degree than others interconnecting them.

2 Claims, 4 Drawing Figures

LIMITING OF CONTINUOUS EXTENT OF INFLATABLE RESTRAINT

FIELD OF THE INVENTION

This invention relates to safety devices for vehicle occupants, more particularly to inflatable restraining band safety devices.

DESCRIPTION OF THE PRIOR ART

Seat belt devices to secure vehicular occupants in their seats in general use today usually include seat belt webbing, one end of which is mounted to the vehicle with the other end or ends attached to a buckle and a cooperating tongue. Such seat belts are designed to restrain an occupant in his seat during a collision by limiting the forward motion of the occupant with respect to his seat as a result of the collision. That is, the wearer moves forward and impacts against the seat belt webbing which thereafter restrains him against further forward motion.

Safety devices of the air bag type have been proposed in which an inflatable air bag is mounted in the interior of the vehicle and is inflated in response to a sensing device which is actuated by a collision of the vehicle. Air bags are designed to prevent the occupant from striking the vehicle structure and operate by cushioning the forward motion of the occupant during a collision.

It has been proposed to combine the two types of safety devices mentioned above, as, for example in the U.S. Pat. No. 3,682,498 to Rutzki, and assignee's copending application Ser. No. 290,917 entitled "Vehicle Safety System" filed on Sept. 21, 1972, which application is hereby incorporated herein as reference.

SUMMARY OF THE INVENTION

In accordance with this invention, an improved vehicle safety system is provided which comprises an inflatable restraining means comprising a unitary inflatable member, said inflatable member being inflatable to a cross-section greater than when uninflated (and folded), and means for inflating said member in response to a preselected condition of the vehicle.

More particularly, a vehicle safety system of the inflatable restraining band type is provided in which the inflatable restraining band has a series of inflatable sections which expand to a greater degree than other sections connecting said first sections. This may be accomplished by providing an inflatable band of uniform width wherein portions thereof are stitched in the folded condition with frangible stitching, while other portions interconnecting the first portions are stitched with stitching which is not frangible, to allow greater expansion of some portions than others. By not allowing full expansion of interconnecting portions or sections of the inflatable band the overall band is foreshortened to a greater extent than otherwise on expansion, which causes greater retensioning of the band against the occupant restrained before movement thereof in an accident condition.

DESCRIPTION OF THE PREFERRED EMBODIMENT

In accordance with a preferred embodiment of this invention, a unitary inflatable restraining band safety device 10 is provided for vehicle occupants which comprises a series of hollow portions 12, 14, 15, 16, 17 some of which are inflatable to a greater degree than others and which are adapted to be inflated prior to any substantial forward motion of the wearer with respect to his seat as a result of a collision of the vehicle or other predetermined condition which is sensed by a sensing means.

The term "vehicle" as used herein refers to conveyances for carrying people such as automobiles, aircraft and the like.

Figure 1:
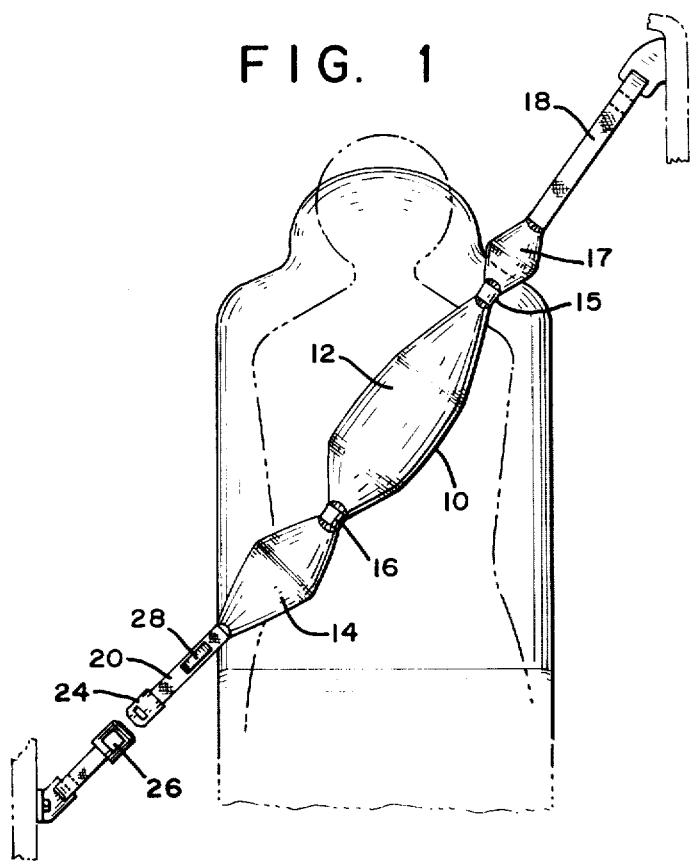
FIG. 1 is a perspective view of one embodiment of the inflatable band of this invention in its inflated condition fastened about an occupant of a vehicle.
Figure 2:
FIG. 2 is an enlarged sectional view of the inflatable band in its uninflated folded condition.

Referring to the drawings wherein some reference numerals refer to the same or like parts, a unitary inflatable band restraining means 10 includes inflatable sections 12, 14, 17 and intermediate, connecting lesser inflatable sections 16 and 17 extending in a single pass (only once) across the body of an occupant of a vehicle. End sections comprised of seat belt webbing 18, 20 connect the band to the vehicle. Band 10 is preferably formed of a generally tubular sleeve and is normally maintained in the form of a folded uninflated hollow tube, as shown in FIG. 2.

The inflatable sections are normally rolled, folded or otherwise maintained in the uninflated position. Preferably, the band 10 including sections 12, 14 is folded to provide a seemingly flat (that is, generally two-dimensional) seat belt section as in FIG. 2; and the folds are maintained in the tube by suitable fastening means such as stitches 22 or the like.

The band 10 is preferably formed from a section of material of a tubular configuration which is cut to the desired length to provide a unitary structure having continuous inner and outer walls. Alternatively, the band may be formed from a plurality of flat lengths of material which are connected to each other along their longitudinal edges directly by means of stitching, slips, adhesive or other fastening means or indirectly by means of an intermediate strip of material, suitably attached to each flat fabric by similar fastening means. However, a unitary section of tubular fabric is preferred because of its high strength.

Although it is preferred to form the band 10 from a tube of fabric, it may alternatively be formed from high strength plastic or rubber materials by such processes as extrusion, etc. For example, the webbing may be formed from tubular stock of nylon, polyester, polyethylene, polypropylene, or other plastics or rubber.

It is desired that band 10 be of relatively low porosity, that is, have a relatively low gas permeability, so that inflatable sections when inflated with a gas retain their inflated state by substantially preventing escape of the gas. For this purpose, band 10 may be preferably woven tightly and is coated or otherwise provided with a nonporous coating. Any conventional coating composition may be utilized for this purpose, such as polyurethanes, rubbers, etc. and the quantities utilized depend upon the type of fabric to be coated, the coating composition, as well as other factors which are apparent to those skilled in the art. In certain instances, it may be desired to provide band 10 with a desired degree of porosity, such as by eliminating the impervious coating or providing apertures in the webbing.

Figure 3:
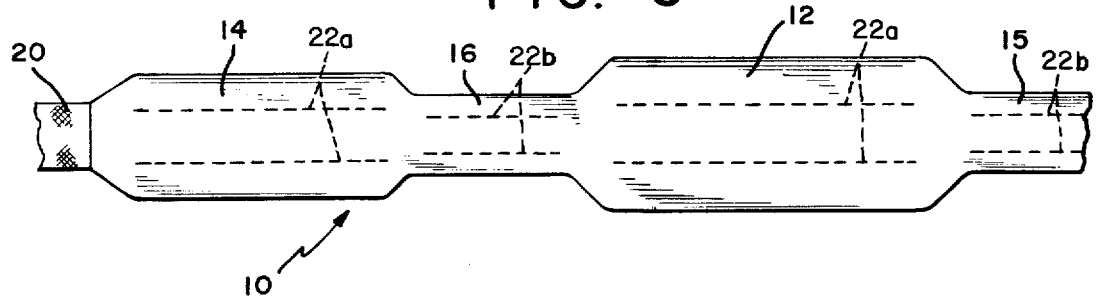
FIG. 3 is a detail view of the band before inflation or folding showing the band with stitching.

The most expandable portions 12, 14 and 17 of band 10 are connected by intermediate portions 16 and 15, see FIG. 3. The band is fastened to buckle tongue 24 by webbing 20 which is adapted to be attached to a buckle 26 secured to the vehicle. The upper inflatable end 17 of the band 10 is connected by webbing 18 to a bracket on the vehicle. Ends 18 and 20 are normally fastened to the vehicle at the ceiling and floor, respectively.

Referring to FIG. 2 the band is normally held along its longitudinal axis by frangible stitches 22 in a folded condition, as an N or W configuration.

Inflating mechanism 28 may be located at the buckle tongue 24 and connected to the inflatable band interior by conventional means. Alternatively, the inflating mechanism may be a plurality of inflating mechanisms in communication with the inflatable portions adjacent both the outer ends 18 and 20.

Figure 4:
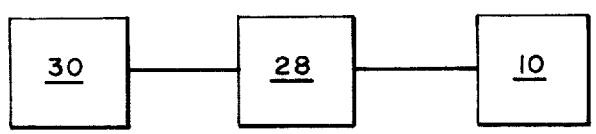
FIG. 4 is a schematic diagram of the sensing and inflating mechanism associated with this invention.

The inflating means may also be located interiorly of an inflatable section 12 or a plurality of sections 12 and 14. For example, gas storage cartridge 28 may be provided in inflatable section 12, which cartridge is preferably filled with a pressurized gas and is electrically connected to sensing means 30 (see FIG. 4). Such gas may comprise nitrogen, air, argon, etc.

Cartridges 28 are adapted to release the contained gas into the inflatable sections upon receipt of an electrical signal from sensor 30. For example, cartridges 28 may include a valve which is opened in response to an electrical signal from sensor 30 to release gas interiorly of the inflatable section to inflate the same.

Cartridges 28 may be held in place in the webbing, or in the buckle, or interiorly of inflatable band section by any suitable means, such as by stitching.

Inasmuch as seat belt buckles, webbing and retractors are well known in the art and may be of a variety of designs, they are not specifically described herein.

Inflating means 28 is selected to inflate the inflatable band in a very short time after actuation thereof by a sensing means by introducing gas into the inflatable band section 12, 14. For this purpose, sensing means 30 is electrically connected to and actuates inflating means 28 immediately upon sensing a preselected condition of the vehicle (e.g., as in a collision or upon rapid deceleration of the vehicle). Sensing means 30 is capable of sensing and actuating the inflating means before any substantial forward movement of the wearer as a result of the occurrence of the preselected condition. The sensing means may be any vehicle sensitive device which can sense and actuate the inflating means 28 within a desired very short period of time after occurrence of such condition. As sensing means there may be provided any of the sensing devices which are suitable for use with an inflatable air bag restraining system, such as sensing devices of the inertia type and the crush type. Such sensing means are known in the art and thus are not more particularly described herein. Examples of suitable sensing devices are those shown in U.S. Pat. No. 3,668,063 to Bell. As stated above, such sensing means are responsive to a condition of a vehicle, most preferably a collision thereof, rather than being responsive to the movement of the wearer into the restraining device. As a result, the vehicle safety system thereof is capable of restraining the wearer prior to his moving with respect to his seat as a result of a collision.

The inflating means 28 include a gas source which may be of the gas generating type (activated by means of a pyrotechnic device, for example) or stored gas type or a combination of both. As these gas sources also are known in the art, particularly with respect to proposed air bag restraint systems, they are not specifically described herein.

As stated, inflating means 28 is connected to the exterior of inflatable section or may be located interiorly thereof. When inflating means 28 is located outside inflatable sections, the gas source may be provided with suitable tubing or the like to connect with the interior of the sections. When stored gas is used as the gas source, a valve or similar device may be provided to separate the gas source and connecting tubing. Such a valve would normally be closed but is opened upon actuation of inflating means 28 by sensing means 30. Valves may also be employed with hybrid gas sources (that is, a combination of stored and generated gas) or generated gas sources, as desired. When inflating means 28 is located outside of inflatable section, it is preferably connected to the retracting portion of the restraint by means of suitable tubing or the like, which portion has connected thereto a tongue portion of a buckle. The gas source may be provided at any desired location within the vehicle, such as under a seat thereof, affixed to the floor, side portion or ceilings, etc.

In operation, inflatable band 10, which may include both shoulder and lap sections but is shown as only a shoulder section, is secured about the body of the wearer. When a collision or other preselected condition of the vehicle occurs, sensing means 30 senses the same and immediate signals and actuates inflating means 28 which thereupon introduces a gas into the inflatable portions. The force of the gas introduced into and expanding within the inflatable portion is sufficient to break the stitches 22a which normally holds the inflatable shoulder portion in its uninflated state and to inflate it. Portions 15 and 16 of the band are restrained from the same expansion by stretchable but nonfrangible stitching 22b or other restraining material at that portion of the band. The stitching therefore comprises frangible stitching 22a along those sections of the band where inflation is desired and stretchable but nonfrangible stitching 22b along section 16, for example, where lesser inflation is desired. In one embodiment, inflatable shoulder portion 10 should be from 20 inches to 30 inches preferably from 24–28 inches long. The inflatable sections thereof in one embodiment expand to a circumference of 15–25 inches, preferably 18–22 inches. The overall volume of the inflatable section should be of a volume in the range of 400–800 cubic inches, preferably 600–700 cubic inches. The crimping of the inflatable band at sections 15 and 16 which interconnect the inflated sections and which are not inflated to the same volume in view of the nonfrangible stitching results in foreshortening of each of the inflatable sections of the overall band extending in one pass over the occupant and greater positioning force placed on the occupant restrained before he moves.

Since the inflated band grows shorter in length when inflated, it not only presses against the occupant as it is inflated but applies a tensioning force to the occupant (in the nature of a squeezing force) due to its foreshortening. By breaking the inflatable band into a plurality of, such as three, shorter inflatable areas interconnected by the areas of lesser inflation, the shortening is increased and the overall inflatable band presses on the occupant to a greater extent than otherwise.

While exemplary embodiments of the invention have been described, the true scope of the invention is to be determined from the following claims:

I claim:

1. A folded inflatable restraining member for a vehicle safety system comprising a unitary inflatable member folded in uninflated condition to be in the form of a seat belt with frangible means ruptured on commencement of inflation to allow full inflation thereof, said folded member extending in a single pass across the chest of an occupant of the vehicle, said inflatable member comprising at least two fully inflatable sections integral therewith and one intermediate section integral therewith which is inflatable but to a lesser extent than said fully inflatable sections, said unitary member extending across the chest of the occupant to points of connection on the vehicle on either side of the inflatable sections, means capable of rupturing said frangible means on commencement of inflation of said member in response to a preselected condition of the vehicle, and said first inflatable sections in gas communication with one another via said intermediate portion.

2. The inflatable restraining means of claim 1 wherein stitching is provided to maintain said inflatable member in folded position when not inflated, said stitching being frangible on commencement of inflation to allow inflation of the first sections and nonfrangible to prevent substantial inflation of the intermediate portions.

* * * * *